Aug. 4, 1970     J. H. LEMELSON     3,523,055
COMPOSITE MATERIAL, APPARATUS AND METHOD FOR PRODUCING SAME
Filed Aug. 19, 1968

INVENTOR.
JEROME H. LEMELSON

United States Patent Office 3,523,055
Patented Aug. 4, 1970

3,523,055
COMPOSITE MATERIAL, APPARATUS AND
METHOD FOR PRODUCING SAME
Jerome H. Lemelson, 85 Rector St.,
Metuchen, N.J. 08840
Continuation-in-part of application Ser. No. 609,455,
Jan. 16, 1967. This application Aug. 19, 1968, Ser.
No. 753,620
Int. Cl. B65d 85/00; E04c 2/10
U.S. Cl. 161—43      17 Claims

ABSTRACT OF THE DISCLOSURE

Improved structures in composite packaging materials are provided as well as an apparatus and method for producing same. The materials are in the form of expanded sheets or panels containing air cells arranged to maintain wall portions apart from each other. In a preferred form, the composite material is made at least in part of plastic film which is sealed or bonded to one or more capping sheets and arranged to define a plurality of enclosed cells containing air under pressure. In another form, capping sheets of a composite panel are maintained apart by spacers and are held in assembly with each other by a thin sheet member or members disposed therebetween.

RELATED APPLICATIONS

This is a continuation-in-part of copending application Ser. No. 609,455 filed Jan. 16, 1967, entitled Panel Construction, now abandoned, which in turn, is a continuation-in-part of a parent application Ser. No. 277,340 filed May 1, 1963, for Method of Making Building Panels now U.S. Pat. 3,398,883.

SPECIFICATION

This invention relates to new and improved structures in composite sheet materials, such as panels, which are particularly usable for the fabrication of packaging containers such as cartons and the like.

It is known in the art to fabricate a paperboard panel or sheet having, for example, capping sheets of kraft paper and one or more corrugated formations of paperboard disposed therebetween. Suitable adhesive is provided to glue the corrugated portion to the capping sheets. It is also known in the art to dispose an expanded plastic such as foamed polystyrene between sheets of kraft paper to provide a carton-forming material. While such materials have many useful purposes, both have certain limitations with respect to strength. Corrugated board may be easily folded in the direction of the longitudinal corrugations. Paperboard capped foamed plastic paneling, while light in weight, exhibits little strength in either direction. Accordingly, it is a primary object of the instant invention to provide new and improved structures in composite, laminated sheet materials having numerous applications in the field of packaging and certain advantages over conventional corrugated cardboard.

Another object is to provide a composite sheet or panel material employing relatively low cost flexible plastic film disposed between capping sheets of low-cost paperboard or plastic, the film being maintained in a state of tension by fastening means and/or air pressure to enhance the strength of the material.

Another object is to provide an improved apparatus and method for producing a composite sheet of panel made of capping sheets and a filling material made of low cost plastic film which is formed into a plurality of cells or pockets.

Another object is to provide an improved packaging material formed at least in part of thin plastic film which is sealed to form a plurality of pockets or cells each of which entraps a predetermined quantity of air operative to maintain the cell walls apart and provide a cushion structure having shock-absorbing qualities.

Another object is to provide a composite panel having capping sheets separated by a plurality of cells formed therebetween of thin sheet material, which sheet material is maintained in a state of tension by foamed plastic which fills only certain of the cells.

Another object is to provide an improved apparatus and method for producing a composite panel on a continuous basis by extruding one or more plastic formations and automatically disposing said formations between opposed capping sheets and bonding same to the inside surfaces of said capping sheets.

With the above and other such objects in view as may hereinafter more fully appear, the invention consists of the novel construction, combination and arrangement of parts as will hereinafter be more fully described and illustrated in the accompanying drawings, but it is to be understood that changes, variations and modifications may be resorted to which fall within the scope of the invention as claimed.

Figure 1:
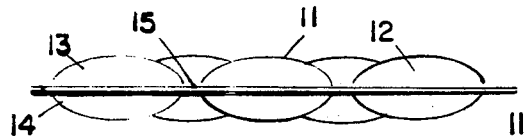
FIG. 1 is an end view of a formation of plastic sheet material defining a plurality of separated and enclosed pockets, said material being usable to form a composite sheet or panel.
Figure 2:
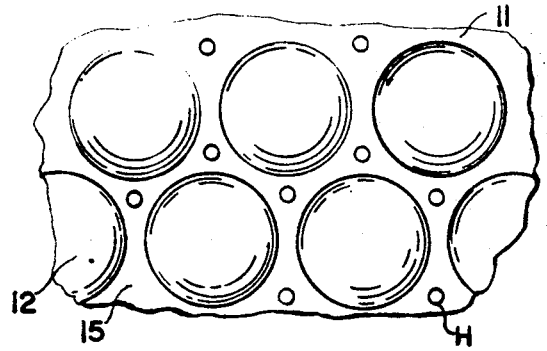
FIG. 2 is a plan view of the material of FIG. 1.

In FIGS. 1 and 2 is shown a portion of core material 11 for the paneling of the instant invention which is fabricated of plastic film shaped and having portions of its walls sealed together to form a plurality of closely spaced envelopes, pockets or blister-like formations 12 defining closed cells with portions 15 of said sheet material flattened and sealed together between the formations 12. The core material 11 may be fabricated of plastic film in the range of .0005 to .010″ thick depending on the thickness of the total panel to be constructed thereof and the load it is to support. For most applications, film in the range of .0005 to .002″ thick will suffice to form the material 11 which may be automatically formed of two sheets of said film by means to be described or of a tubular formation thereof which is extruded or blown to shape and compressed between rotary dies to seal the portion 15 of opposite walls together and to form the pocket formations 12.

Figure 3:
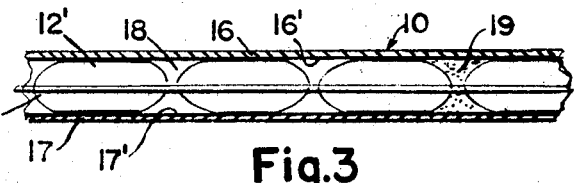
FIG. 3 is an end cross-sectional view of a composite panel employing the material of FIGS. 1 and 2 as a component thereof.

The plastic film of which the member 11 is fabricated, is preferably a flexible polymer such as polyethylene, polypropylene, polystyrene, ethylene vinyl acetate, polybutadiene-styrene, polyamide or other suitable polymer provided in relatively thin gauge while the air entrapped in the pocket formations 12 is under positive pressure either prior to or after the core member 11 is inserted between and laminated to a plurality of capping sheets as illustrated in FIG. 3. The formations 12 shown in FIG. 2 are each circular in shape at the plane of the welded portions 15 of the sheet, although they may be any suitable configuration including ellipsoidal, semi-spherical, triangular, oblong or other shape formed adjacent or spaced apart as shown.

In FIG. 3, the cellular core sheet 11 is shown disposed between a pair of capping sheets 16 and 17 with the upper and lower portions of the pocket formations 12' being bonded or welded to the inside faces 16' and 17' of said capping sheets. If the material of which core formation 11 is fabricated is an ionomer resin or poly-vinylidene chloride, it may be heat sealed to the smooth surfaces 16' and 17' of the sheets 16 and 17 by conducting heat through said sheets or generating heat at the interfaces of said sheets and the upper and lower surfaces of the core formation 11. If the material of which formation 11 is fabricated comprises polyethylene, polyvinyl chloride or other suitable resin, it may be bonded to the faces 16' and 17' of the capping sheets with a suitable adhesive sprayed or otherwise applied to either or both the contacting surfaces or may be heat sealed to films of similar material coated on the surfaces 16 and 16' or laminated thereto. The capping sheets 16 and 16' comprise, in a preferred form of the invention, sheets of paper, paperboard or cardboard, thus providing a relatively inexpensive composite sheet material which is applicable as dunnage or batting in packaging or, if the capping sheets 16 and 17 are rigid paperboard, as a wall material for cartons and the like.

In certain applications, it will be preferable or necessary to provide additional means for maintaining the capping sheets 16 and 17 apart while the walls of the formations 12 of the core material 11 are kept in a state of tension. While fasteners, paperboard or other material may be disposed between said sheets extending between the surfaces defined by portions 15 of the material 11 and the capping sheets 16 and 17, a suitable construction involves the use of a filler material such as a cellular plastic disposed either in all of the volumes 18 defined between the outer surfaces of the pocket formations 12 and the inside surfaces 16' and 17' of the capping sheets or by disposing such filler material only between a portion or portions of the volumes 18. A self-expanding plastic may be poured or sprayed into the volumes 18, expanded and solidified in situ therein as shown at 19 in FIG. 3 to serve as a further support for the sheets 16 and 17 and to press outwardly thereon, when solidified.

The sheets 16 and 17 may also comprise sheets of flexible or rigid plastic, aluminum or steel foil or other suitable material. Holes H may be provided in the portions 15 of the core material 11 to permit filler material 19 to flow from the upper portions of the volume 18 into the lower portions thereof prior to setting.

Figure 4:
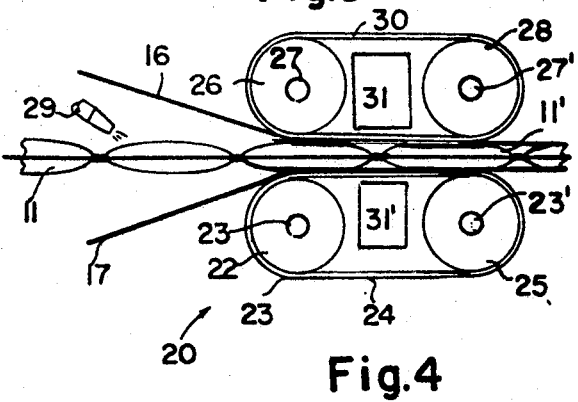
FIG. 4 is a side view of part of an apparatus which is operative to produce material of the type shown in FIG. 3.

An apparatus 20 for producing the composite sheet material 10 of FIG. 3 is shown in FIG. 4 and includes means (not shown) for feeding the described core material 11 between the two capping sheets 16 and 17 as all three sheets are fed to a laminating apparatus comprising opposed assemblies for driving respective belts 24 and 30 at the speed at which components 11, 16 and 17 are fed therebetween. The belts 24 and 30 are each driven about respective rolls or drums 22, 25 and 26, 28 to compress the inside surfaces of the sheets 16 and 17 against the compressible blister formations 12 of the core material 11. While so compressed together, heat is generated by a suitable heating means 31 and 31' disposed between the upper and lower belt assemblies. The heating means may comprise respective radiant heaters each operative to heat respective of the belts for conducting heat through the sheets 16 and 17 to the inside surfaces thereof contacting the formations 12 and to effect heat sealing of said formations to said inside surfaces of said sheets as described. The drums are mounted on respective shafts 23, 23' and 27, 27', at least two of which are driven by a motor to drive the respective belts at constant speed to feed the laminated assembly therebetween. The heating means 31 and 31' may also comprise a microwave heating apparatus for generating heat at the interfaces of the pockets 12 and the sheets 16 and 17 for properly heat sealing the material of the core member 11 and either said sheets 16 and 17 or heat sealable plastic coated thereon. Notation 29 refers to a nozzle disposed between sheet 16 and the upper surface of formation 11 for spraying or flowing adhesive and/or self-expanding plastic against the upper surface of 11 to fill out the void volume of voids 18 as described and to provide additional support for the composite sheet.

Either or both the sheets 16, 17 and the core material 11 may be fed from coil formations thereof or from means for automatically and continuously producing same. For example, sheets 16 and 17 may be fed from respective dies of an extruder or extrusion machines while sheet 11 may be automatically and continuously formed from one or two sheet extrusions by apparatus located upstream of the apparatus 20 shown in FIG. 4 and synchronized in its operation thereto.

Figure 5:
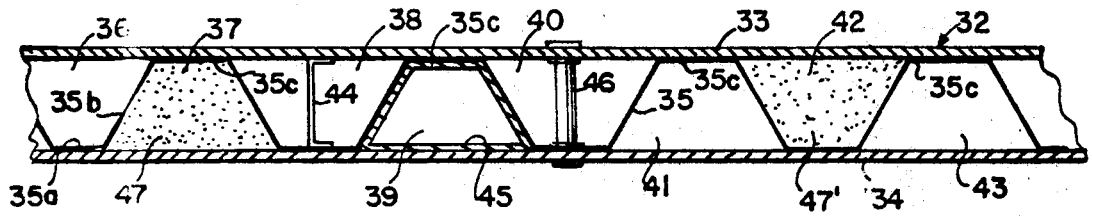
FIG. 5 is an end cross-sectional view of a modified form of composite sheet or panel having certain of the features shown in the panel of FIG. 3.

FIG. 5 shows another form of composite panel having a core made of a single sheet 35 of rigid or flexible plastic material, preferably in film thickness. The sheet 35 is shown disposed between and bonded or heat sealed along portions thereof to the inner faces of respective capping sheets 33 and 34 which may be made of any of the materials hereinabove described for the capping sheets of the assembly 10. Portions 35a of the sheet 35 which may comprise circular, oblong or strip-like formations thereof are shown bonded or heat sealed to the inside surface of sheet 34 while portions 35c of said sheet 35 and preferably of similar shape to the portions 35a, are shown bonded or heat sealed to the inside surface of sheet 33.

In a preferred form of the structure shown in FIG. 5, the sheet 35 is of insufficient rigidity to support the sheets 33 and 34 apart and, accordingly, such support is provided by one or more auxiliary means such as by gas pressurizing the volumes 36–43, and/or by filling said volumes with a foamed plastic material. Such support may also be provided by means of fasteners or other suitable means. For example, volumes 37 and 42, which are separated from each other by volumes 38, 39, 40 and 41, are shown containing formations 47 and 47' of filler material which may comprise a foamed plastic such as expanded polystyrene, polyethylene or polyurethane, which may be foamed in situ therein or disposed therein after being formed to shape. Certain, if not all, of the unfilled volumes such as 38, 39, 40, 41 and 43 may also be gas pressurized or contain gas entrapped therein to maintain the capping sheets 33 and 34 apart and to maintain the connecting portions 35b of the sheet 35 in a state of tension.

Notation 44 refers to a strip of flexible plastic which is heat sealed or bonded near its ends to the inside faces of sheets 33 and 34. Member 44 may also comprise a rigid, channel-like extrusion disposed between the two sheets to maintain them apart and to maintain the sheet material 35 in tension. A plurality of rigid structural members such as 44 may be co-extruded between the two sheets or otherwise applied in between and having their flanged portions heat sealed or bonded to the inside faces of the sheets 33 and 34. The material 47 may also be intermittently or continuously extruded between the sheets 33 and 34 either after they are completely formed to shape or in a condition whereby said material self-expands in the channels or pockets formed by the material 35. Also shown in FIG. 5 is a box-like formation 45 of rigid plastic which may be extruded between the sheets 33 and 34 as a plurality of spaced-apart formations, with or without the other structural elements illustrated in FIG. 5. Fasteners or spacers 46 may also be automatically disposed through and between the sheets 33 and 34 to maintain them together against the above-described inflation forces and/or to maintain them separate from each other against buckling.

The composite assembly 32 of FIG. 5 may also be continuously and automatically fabricated by the extrusion of a plurality of materials including the capping sheets, the filler core material 47 and spacer material such as that defined by any or all of the formations 35, 44 and 45.

Figure 6:
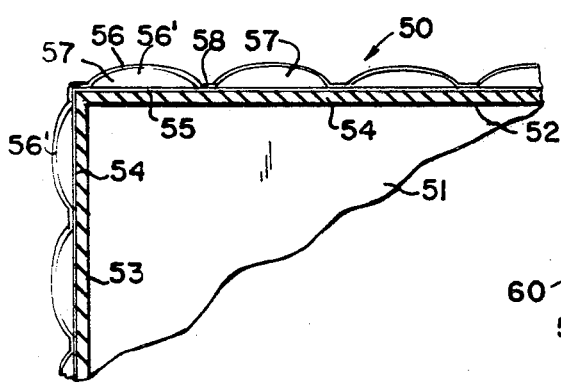
FIG. 6 is a cross-sectional view of a fragment of a container having certain constructional features of the instant invention.

FIG. 6 illustarates a modified form of the invention in the shape of a container 50 having side walls, two of which, 52 and 53 are shown, with each comprising a base 54 made of paperboard or cardboard having coated or laminated to its outer surface a thin sheet or film 55 of thermoplastic material against which is heat sealed a second sheet or film of thermoplastic material denoted 56 and formed in the shape of a plurality of pocket-like formations 56' each of which is totally enclosed and sealed from the atmosphere so as to entrap air in the volumes 57 defined between the formations 56' and the film or coating 55 on the outer surface of the cardboard 54. Notations 58 refer to those portions between the pocket formations 56 which are bonded or heat sealed to the film 55 covering the surface of wall member 54.

By providing a container made of a base enclosure 51 of cardboard and having a plurality of pocket formations sealed to the outer surface of the base container 51 and defining the outer surface of the container assembly 50, a relatively low-cost quilt-like surface decoration may be provided having attractive, three-dimensional shape and also having cushioning resiliency to protect the container and its contents against impact shocks. While the formations 56' are illustrated as each being substantially similar in shape and each may comprise oblong or round formations of the type shown in FIGS. 1 and 2, they may be of any suitable shape across the surfaces of one or more of the side walls of the container 50.

A further structure based on the construction shown in FIG. 6 may include or comprise formations 56' provided on the inside surfaces of the side walls 52, 53, etc. of the paperboard container 51 for cushioning the contents of said container. In other words, the formations 56' of the sheet material 56 may be bonded directly to the inside surfaces of the walls 52 and 53 or to a coating or film disposed thereon. A container having formations similar to 56' on both the inside and outside surfaces of its wall may also be fabricated employing the structure illustrated to provide exterior cushioning for the container and its contents and interior cushioning for the contents of the container.

If the material of which the film 56 is fabricated comprises an ionomer resin or polyvinylidene chloride, the film 55 may be eliminated by heat sealing the film 56 directly to the outer and/or inner surfaces of the side walls of the container to provide totally enclosed, air-containing pocket-like volumes 57 as shown.

Figure 7:
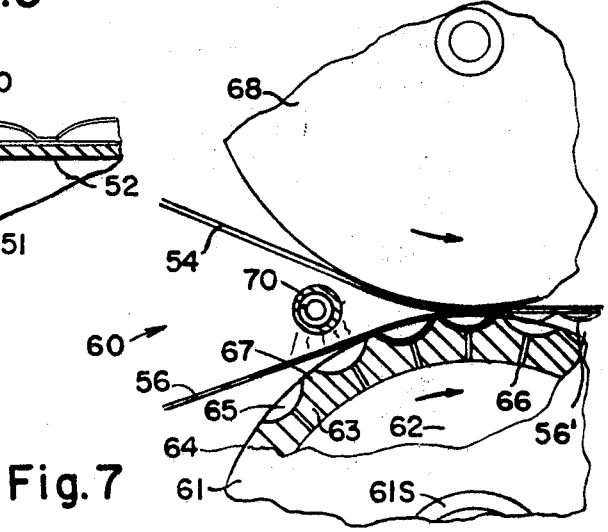
FIG. 7 is a fragmentary view with parts broken away for clarity of an apparatus for producing composite material in the realm of the invention.

In FIG. 7 is shown an apparatus for producing composite material of the type utilized in fabricating the container of FIG. 6. The apparatus 60 includes means (not shown) for supplying and feeding thin plastic sheet or film 56 of the type herein above described to the bite of a pair of rolls 61 and 68 together with a sheet of paperboard 54. The roll 61 rotates on a shaft 61S and has a cylindrical side wall 63 surrounding an internal volume 62 which is operatively connected to a source of negative pressure such as a vacuum pump. The peripheral surface 64 of the side wall 63 is provided with a plurality of cavities 65 of spherical, oblong, cylindrical or other shape for shaping the plastic sheet or film 56 to form the walls of the pocket-like enclosures thereof. A suitable radiant heater 70 is disposed between the sheets 56 and 54 to heat soften sheet 56 just as or before it engages the surface 64 of the drum 61. Passageways or elongated holes 66 communicate between the cavities 65 and the interior volume 62 of the drum so that when suction or negative pressure is applied to said volume 62 such as by connecting the end of the hollow drive shaft 61S on which the drum 61 is mounted to a vacuum pump, the heat softened film will be drawn into the cavities 65 in the surface of the drum thereby deforming said film to conform to the surfaces of the cavities. The surface formations 67 between the cavities serve to support and engage the non-deformed portions of the film 56 against the facing surface of the sheet 54 of paperboard or cardboard and to heat seal said portions (equivalent to formations 15, FIG. 1 or 58, FIG. 6) to the contacting surface of member 54 or a thermoplastic material coating or laminated to said surface as described. Thus, when the composite material comprising deformed sheet 56 and the base sheet 54 exits from between the drums 61 and 68, a formation of the type shown in FIG. 6 is provided at 56' in FIG. 7.

By providing cavities in the wall of drum 68 and the other structural means shown as associated with drum 61 in FIG. 7, a pocketed core material of the type shown in FIGS. 1 and 2 may be fabricated automatically and may be fed, for example, to the apparatus shown in FIG. 4.

In another form of the invention, nozzle or dispensing means may be disposed between sheets 56 and 54 for dispensing a suitable, self-expanding foamed plastic between the two sheets just prior to their deformation and their sealing together to provide a composite material of the type shown in FIG. 1 but having cellular foamed plastic disposed in certain, if not all, of the pocket-like formations 12 which expands in situ therein to provide a film containing cushioning material.

In still another form of the invention, it is noted that a new and improved type of flexible cellular foamed plastic material may be produced by disposing a self-foaming resin between rolls or dies and permitting the blowing or foaming agent therein to form the cells fo the resin and to generate gas in the cells so formed, which gas becomes entrapped within said cells at a pressure above atmospheric pressure when the plastic material is prevented from totally expanding. Very flexible, closed cell, foam material must thus be internally supported by small quantities of gas entrapped under positive pressure within each of the cells.

Further with respect to the apparatus 60 shown in FIG. 7, if the heater unit or radiant heating tube 70 is eliminated and cavities such as 65 are provided in the peripheral surfaces of both drums 61 and 68 spaced and shaped so as to become aligned with each other as the drums are power rotated and means as described are provided for vacuum drawing respective films into said cavities in both said drums, then a tube of blown or extruded plastic film may be continuously fed to the bite of said drums in a substantially flattened condition with the opposite walls of said tube being compressed and welded together by the aligned land or surface portions 67 of the drums while the material therebetween of each wall of the tube is drawn into said respective aligned drum cavities to form the pocketed inflated sheet material shown in FIGS. 1 and 2.

In still another technique applicable to the apparatus of FIG. 7, the described means for applying vacuum to the drum cavities 65 may be eliminated by providing means, such as a nozzle or conduit, containing a plurality of orifices disposed closely adjacent the sheet or sheets being fed to the drum for ejecting air or gas under sufficient pressure against those portions of the sheet to be deformed, to cause the heat softened sheet to be deformed into and to conform to the surfaces of the cavities 65. While vacuum need not be applied to the interior volume of the drum or drums, the passageways 66 communicating between the cavities and the drum interior may be provided to permit air entrapped beneath the film and the cavity walls to escape thereby simplifying the deformations of the sheet material into said cavities. If the air so ejected against the sheet 56 is hot air, it may be provided at a temperature such as to thermally soften the sheet material to permit it to be permanently thermoformed into said cavities. The peripheral walls of the drums may also be heated a degree to heat soften the sheet material driven thereagainst, and to permit the welding of those portions of the sheet engaged by the land portions 67 of the drum or drums.

In a modified form of apparatus for producing sheet materials of the types shown in FIGS. 1 and 6, the drums 61 and 68 may be replaced by reciprocating dies or platens having cavities, such as 65, formed in their surfaces and means for thermally deforming and heat sealing thermoplastic film or sheet as described, which is fed thereto in the combinations described. Such reciprocating platens may be automatically operated and synchronized in their reciprocation to engage, thermally deform and seal tandem lengths of said sheet material(s) together as described. In other words, either or both the platens may be moved to compress the two sheets together between the land portions of the cavity containing platen and the surface of the other platen or between similarly shaped land portions of the other platen, and operated to weld the portions 58 or 15 of the sheet material together while the portions of the plastic film therebetween are vacuum drawn into the platen cavities by vacuum applied to the cavities after which, the platens may be separated permitting removal of the formed section of the sheet. Sheet driving means may be operative thereafter to dispose a new section of the composite material or sheets between the platens for repeating the same operation thereon.

In still another form of apparatus and method of the instant invention, the multiple sheets 56 and 54 of FIG. 7 may be replaced by a single lamination of two thermoplastic sheets or by a thermoplastic sheet supported on a cardboard sheet which is driven between the two drums. While said material is disposed between said drums or just prior to entering the bite of said drums, heat is applied thereto to heat soften the thermoplastic sheet or film whereby portions of said film may be drawn away from the other sheet to which it is laminated and deformed into the cavities in the drum by means of vacuum applied to said cavities. Those portions of the film which are not so drawn and thermally deformed remain in engagement with and are welded to the other sheet to provide a material of the type shown in FIG. 1 or FIG. 6.

In a modified form of the apparatus of FIG. 7, it is noted that a suction pump may be mounted directly within the drum or drums requiring suction at the cavities against which the film is being drawn. Said pump may be supported on a stationery shaft extending axially across the drum and may be provided with suction conduit means communicating only with the cavities at the bite of the drums.

I claim:
1. A composite panel comprising in combination:
 (a) a first sheet made of a rigid material defining a capping sheet,
 (b) a second sheet material of flexible plastic and of substantially less thickness than said first sheet,
 (c) said flexible plastic sheet material abutting portions of a major surface of said first sheet,
 (d) said flexible plastic sheet material being formed into a plurality of enclosed cells defining respective volumes separate from the volumes of the other cells,
 (e) at least certain of said cells containing air entrapped therein under sufficient pressure to support and maintain the opposite walls of said composite panel separated from each other,
 (f) there being space separated portions of the outer surface of said flexible plastic sheet material bonded to said rigid sheet material.

2. A composite panel in accordance with claim 1 having opposite walls defining the opposite wall portions of each of said cells, there being capping sheets covering each of the opposite walls of said cells and each of said capping sheets being bonded to said space separated portions of said cell walls.

3. A composite panel in accordance with claim 2, there being volumes defined between both said capping sheets and the outer surfaces of said cell walls and further means for supporting the capping sheets of said panel separated from each other disposed within at least certain of said volumes defined between said capping sheets and the outer surfaces of said cell walls.

4. A composite panel in accordance with claim 3, said further supporting means comprising cellular foamed plastic filling at least part of said volumes between said capping sheets and the outer surfaces of said cell walls.

5. A composite panel in accordance with claim 2, there being flat portions of said flexible plastic sheet joining the cells formed of said sheet and a plurality of holes through said flat portion of said sheet, and a filler material disposed to completely fill the volumes exterior of said cells formed of said flexible plastic sheet and extending through said holes in said sheet to the opposite faces of both said capping sheets.

6. A composite panel in accordance with claim 2, said cells being arcuate in shape and substantially equispaced from each other in said flexible sheet material, said flexible sheet material comprising a resin which is heat sealable to said capping sheets and is heat sealed thereto.

7. A composite panel in accordance with claim 2, said flexible sheet material forming separate enclosures with both said capping sheets with the walls of each cell defined by both said flexible sheet and a portion of a wall of one of said capping sheets, the air in said cells being under sufficient positive gas pressure to manitain the walls thereof apart from each other and to maintain said flexible sheet material extending between said walls under tension.

8. A composite panel in accordance with claim 2, said flexible sheet material extending between and bonded to the inside surfaces of both said capping sheets and defining separate cells therewith, and a foamed plastic material filling but certain of said cells to support said sheets separated from each other.

9. A composite panel in accordance with claim 1, said rigid sheet material comprising a paperboard material, said flexible plastic sheet material having one wall bonded to a surface of said paperboard sheet and bulging outwardly therefrom to define a plurality of pocket formations, each of said pocket formations entrapping sufficient air to maintain the outwardly building portions of said flexible sheet away from the surface of said paperboard material.

10. An article of manufacture in accordance with claim 9 whereby said composite panel is formed into a container having side walls and a bottom wall with said cell formations of said flexible sheet material bulging outwardly from at least one side wall of said container.

11. A method of forming a composite sheet material comprising:
 providing a cushioning material of flexible sheet material formed into a plurality of separate but joined envelopes with each envelope entrapping suffient air to maintain the walls of the envelopes apart from each other,
 disposing said core material against a capping sheet,
 compressively engaging said capping sheet against the raised inflated portions of said flexible sheet material defining the walls of said envelopes to cause portions of the walls of the envelopes to become flattened against the surface of said capping sheet while reducing the width of said cushioning material and compressing the air therein to tension the walls of the envelope portions thereof, and
 while said cushioning material is so compressed and forced into engagement with said capping sheet, bonding the engaging surfaces of said capping sheet and said flattened envelope portions of said cushioning material.

12. A method in accordance with claim 11 which involves compressing opposite faces of said cushioning material between respective sheets of capping material to partially flatten opposite walls of the envelope portion of said cushioning material and sealingly securing the flattened portions of said cushioning material to said two capping sheets.

13. A method in accordance with claim 12, including disposing fastening means in the volumes between said capping sheets exterior of said envelope portions of said cushioning material, said fastening means being secured to said capping sheets and operative to support said sheets.

14. A method in accordance with claim 12 including disposing a self-foaming plastic in the voids between said sheets exterior of said envelope portions of said cushioning material, expanding and solidifying said plastic to fill said voids and provide support for said capping sheets.

15. A cellular structure comprising an expanded, foamed plastic material having a multiple of closed cells joined together by thin flexible walls composed of said plastic material, said cells defining enclosures and each entrapping a quantity of gas within said enclosures, the improvement comprising said entrapped gas being under sufficient positive pressure to substantially support the cell walls of said foamed plastic material from buckling, thereby substantially rigidizing said cellular structure.

16. A cellular structure in accordance with calim 15, including a quantity of liquid entrapped within said cells together with said gas under pressure, said liquid being releasable from the cells upon rupturing or shearing of the cell walls.

17. A composite panel in accordance with claim 1, whereby at least a portion of said composite panel is formed into a container having side walls and a bottom wall, said flexible plastic sheet material being bonded to the inside of said rigid sheet material with the enclosed cells containing air entrapped therein protruding inwardly into the interior volume of said container and serving as a cushioning means for the contents of said container.

References Cited

UNITED STATES PATENTS

| | | | |
|---|---|---|---|
| 2,028,060 | 1/1936 | Gilbert | 52—2 |
| 2,983,636 | 5/1961 | Runton | 156—78 X |
| 3,048,514 | 8/1962 | Bentele et al. | 156—156 X |
| 3,170,832 | 2/1965 | Wilson et al. | 156—273 X |
| 3,205,106 | 9/1965 | Cross | 161—161 X |
| 3,247,627 | 4/1966 | Bird | 52—2 |
| 3,366,523 | 1/1968 | Weber | 156—285 X |
| 3,390,482 | 7/1968 | Holtvoigt | 156—285 X |
| 3,394,415 | 7/1968 | Parker | 5—348 |
| 3,399,407 | 9/1968 | Olsen | 5—348 |
| 3,428,974 | 2/1969 | Stuart | 5—348 |
| 3,411,164 | 11/1968 | Sumergrade | 5—348 X |
| 3,425,889 | 2/1969 | Willits | 161—159 X |
| 3,435,470 | 4/1969 | Krenzler | 156—79 X |
| 3,444,034 | 5/1969 | Hewett | 156—156 X |
| 3,461,632 | 8/1969 | Kuhne | 52—615 |

HAROLD ANSHER, Primary Examiner

U.S. Cl. X.R.

161—160; 156—79, 156, 287; 5—348, 359; 206—46; 52—2, 383, 404, 408, 508, 615, 629, 743